United States Patent
Reinisch et al.

(10) Patent No.: US 8,489,318 B2
(45) Date of Patent: Jul. 16, 2013

(54) EMERGENCY BRAKE ASSISTANT FOR AUTOMATICALLY DECELERATING A VEHICLE TO PREVENT A COLLISION OR REDUCE THE CONSEQUENCES OF A COLLISION

(75) Inventors: Philipp Reinisch, Munich (DE); Peter Zahn, Herrsching A. Ammersee (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 13/549,151

(22) Filed: Jul. 13, 2012

(65) Prior Publication Data

US 2012/0283927 A1 Nov. 8, 2012

Related U.S. Application Data

(63) Continuation of application No. PCT/EP2011/051085, filed on Jan. 26, 2011.

(30) Foreign Application Priority Data

Jan. 29, 2010 (DE) .......................... 10 2010 006 214

(51) Int. Cl.
*G08G 1/16* (2006.01)
(52) U.S. Cl.
USPC ................. 701/301; 701/70; 701/93; 701/96
(58) Field of Classification Search
USPC ................ 701/36, 70, 93, 96, 97, 116, 301
See application file for complete search history.

(56) References Cited

U.S. PATENT DOCUMENTS

| | | | | |
|---|---|---|---|---|
| 4,833,469 A | * | 5/1989 | David | 340/901 |
| 5,278,764 A | * | 1/1994 | Iizuka et al. | 701/301 |
| 6,037,860 A | * | 3/2000 | Zander et al. | 340/436 |
| 6,604,042 B2 | | 8/2003 | Maruko et al. | |
| 6,624,747 B1 | | 9/2003 | Friederich et al. | |
| 7,194,347 B2 | * | 3/2007 | Harumoto et al. | 701/45 |

(Continued)

FOREIGN PATENT DOCUMENTS

| | | |
|---|---|---|
| DE | 198 06 687 A1 | 8/1999 |
| DE | 10 2004 056 027 A1 | 5/2006 |

(Continued)

OTHER PUBLICATIONS

Kaempchen et al, Situation Assessment of an Autonomous Emergency Brake for Arbitrary Vehicle-to-Vehicle Collision Scenarios, IEEE Transactions on Intelligent Transportation Systems, 2009, pp. 678-687.*

(Continued)

*Primary Examiner* — Russell Frejd
(74) *Attorney, Agent, or Firm* — Crowell & Moring LLP

(57) ABSTRACT

The invention relates to an emergency brake assistant for automatically decelerating a vehicle to prevent a collision or reduce the consequences of a collision with a detected collision object, at a determined intervention point in time, a brake system of the vehicle being automatically activated such that a collision with the detected collision object can be prevented or at least the consequences of the collision can be reduced. The invention is characterized in that the intervention point in time can be determined as a function of the end point in time of a determined driver reaction time and of the determined last-possible braking point in time.

16 Claims, 2 Drawing Sheets

U.S. PATENT DOCUMENTS

| | | |
|---|---|---|
| 7,904,246 B2 * | 3/2011 | Kondoh et al. ............... 701/301 |
| 7,954,590 B2 * | 6/2011 | Bernzen et al. ............... 180/282 |
| 8,131,440 B2 * | 3/2012 | Kameyama ..................... 701/70 |
| 8,150,583 B2 * | 4/2012 | Danner et al. ................... 701/45 |
| 2006/0220908 A1 * | 10/2006 | Petersen et al. ............... 340/903 |
| 2008/0270000 A1 * | 10/2008 | Bernzen .......................... 701/79 |
| 2008/0284243 A1 * | 11/2008 | Auer et al. ................. 303/115.2 |
| 2008/0319610 A1 | 12/2008 | Oechsle et al. |
| 2009/0076702 A1 * | 3/2009 | Arbitmann et al. ............. 701/96 |
| 2009/0143951 A1 * | 6/2009 | Takahashi et al. .............. 701/70 |
| 2011/0010094 A1 * | 1/2011 | Simon ........................... 701/301 |
| 2012/0203438 A1 * | 8/2012 | Breuer et al. ................... 701/70 |

FOREIGN PATENT DOCUMENTS

| | | |
|---|---|---|
| DE | 10 2005 003 274 A1 | 7/2006 |
| DE | 601 26 398 T2 | 11/2007 |
| WO | WO 2006/053652 A1 | 5/2006 |

OTHER PUBLICATIONS

Glimm et al, An Accident-Severity Analysis for a Uniform-Spacing Headway Policy, IEEE Transactions on Vehicular Technology, 1980, pp. 96-103.*

German Search Report dated Jan. 18, 2011 including partial English-language translation (Five (5) pages).

* cited by examiner

EMERGENCY BRAKE ASSISTANT FOR AUTOMATICALLY DECELERATING A VEHICLE TO PREVENT A COLLISION OR REDUCE THE CONSEQUENCES OF A COLLISION

CROSS REFERENCE TO RELATED APPLICATIONS

This application is a continuation of PCT International Application No. PCT/EP2011/051085, filed Jan. 26, 2011, which claims priority under 35 U.S.C. §119 to German Patent Application No. 10 2010 006 214.6, filed Jan. 29, 2010, the entire disclosures of which are herein expressly incorporated by reference.

BACKGROUND AND SUMMARY OF THE INVENTION

The invention relates to an emergency brake assistant for automatically decelerating a vehicle to prevent a collision or reduce the consequences of a collision according to the preamble of Claim 1.

Modern driver assistance systems are capable of completely preventing an imminent collision or at least minimizing the consequences of a collision by an autonomously initiated full brake application. By means of a suitable sensor system (radar, lidar, image processing) or the evaluation of vehicle-to-vehicle communication, these systems detect the vehicle environment and determine possible collision objects. When a collision is imminent, a full deceleration will be initiated.

With an increasing relative speed between the given vehicle and the potential collision partner, the path required for this braking will be increased quadratically. Since, in comparison, the distance for a narrow overtaking maneuver or evading maneuver increases only in a linear fashion with the speed, at higher differential speeds, an overtaking or evading will still be possible after the point in time of a collision-preventing braking has already been exceeded. This so-called intervention dilemma results in a target conflict for the design of the emergency brake assistant. If, when the last-possible braking point in time is reached, the assistant intervenes by means of a full deceleration, the collision will be prevented. A driver, who had planned a narrow overtaking or evading maneuver, will, however, be surprised by the intervention. In order to prevent these decelerations subjectively perceived to be faulty and meet the product liability requirements, the systems currently on the market are designed such that a braking does not take place before the point in time at which the driver can neither by braking nor by overtaking or evading still autonomously prevent the collision ("point of no return"). However, at high differential speeds, this has the result that, also by means of the autonomous emergency braking, the preventing of a collision is no longer possible—only the consequences of the collision will be reduced.

From German Patent Document DE 601 26 398 T2, a brake control system with a system intervention in the event of an object recognition is known, which, when the driver's intention to evade is recognized, suppresses an otherwise generated automatic braking intervention for preventing a collision with a detected collision object.

It is an object of the invention to indicate an emergency brake assistant which, while taking into account the above-mentioned problems, can determine an intervention point in time so that, on the one hand, the driver feels sufficiently safe and, on the other hand, is not hindered when carrying out his own driving action.

This object is achieved by means of a emergency brake assistant according to Claim 1. Advantageous further developments are contained in the dependent claims.

The invention is based on an emergency brake assistant for automatically decelerating a vehicle to prevent a collision or reduce the consequences of a collision with a detected collision object, wherein, at a determined intervention point in time, a brake system of the vehicle is automatically triggered such that a collision with the detected collision object is prevented or the consequences of the collision are at least reduced.

In real road traffic, the driver will constantly experience events to which he has to react to in order to prevent a collision—these include the following application cases relevant to an autonomous emergency braking:

A continuous approach to a vehicle ahead,
a sudden braking maneuver of a vehicle ahead as well as, and
an adjacent vehicle cutting into the given traffic lane.

Although no information concerning the subjective driver's perception is available, a model of these reaction triggers can be created by means of the vehicle sensor system. For this purpose, driving-psychological threshold values are used which describe the transition from a following to an approaching that requires a reaction.

Continuously approaching a vehicle within a given trajectory, which in many situations takes place at a high relative speed, can also be described independently of the distance by the time to collision (TTC). In the state of the art, a TTC value of 5 seconds is considered as a threshold below which the driver feels an acute need to act for again increasing the gap between his vehicle and the other vehicle or for evading the obstacle by means of an overtaking maneuver.

In a limited differential speed range, this threshold value can also be indicated as a distance value. It is composed of a constant safety distance when stopped as well as a speed-dependent value. By means of this minimal following distance, the cases of "sudden braking" and "cutting-in" can now be detected. If a vehicle driving ahead were to decelerate in traffic so much so that a following driver of a given vehicle would fall below the safety distance while still moving, a requirement to act would arise for restoring the safe driving condition. This need to act also arises when a vehicle in the adjacent lane starts a cut-in maneuver within the minimal following distance.

Both events would also be recognizable by means of the time-related threshold value TTC. However, the advantage of considering the distance is exhibited by the example of a sudden braking. If the deceleration of the vehicle ahead starts in a driving condition in which it is still moving away from the given vehicle, the computation of the TTC would not yet be possible. By using the distance value, the starting point in time for the beginning of the subsequent reaction can be identified also in such cases.

The invention is characterized in that the intervention point in time can be determined as a function of the end point in time of a determined driver reaction time and of the determined last-possible braking point in time.

The reaction time, which starts after the occurrence of the corresponding reaction trigger and lasts until the point in time at which the driver reaction can be measured on the vehicle bus system, can be modeled by means of the OODA activity sphere. This sphere represents the individual components of human decision-making: O(bserve), O(rient), D(ecide), and A(ct).

The observation process as well as the activity process can be based on approximately constant values averaged for all drivers. The duration of the mere perception of the situation is approximately 0.2 seconds; the execution of the act—thus, the movement of the foot for the actuation of the pedal—because of frequent practice, takes approximately 0.3 seconds.

In contrast, the remaining process steps for the classification, as well as for the decision-making, are dependent on the triggering event; i.e., the driver's reaction time can be determined as a function of the current vehicle environment and/or of the type of the occurrence of the collision object. Unexpected triggers (for example, unpredictable strong braking of the vehicle ahead) or events with a low probability of occurrence lead to a longer phase of decision-making than expected or frequently occurring events. Together, these two process steps can be modeled to be gamma-distributed.

In order to be able to derive a reaction time from the gamma distribution, the risk of exceeding a certain duration is considered. For this purpose, the cumulated gamma distribution is subtracted from one. Accordingly, a risk of 20% means that, in the considered examination, 80% of the drivers required a shorter or precisely the resulting duration for the reaction to the triggering event.

In addition to the dependence on the triggering event or on the type of the occurrence of the collision object, the reaction time resulting from the OODA activity sphere will increase if several acting alternatives are available to the driver. Since the individual occurrence probabilities of the acting alternatives are unknown a priori, they are assumed to be evenly distributed.

For the application case of active danger braking, this means that, in addition to the possibility of braking, the feasibility of an overtaking maneuver also has to be examined. For this purpose, for example, the area adjacent to the vehicle is, in each case, divided into three sub-areas: Behind the given vehicle, laterally at the level of the given vehicle, and in front of the given vehicle. For all areas, a value relevant to a lane change is computed and, in a comparison function, is standardized to a factor between 0 (lane change not feasible) and 1 (lane change safely feasible). The minimum of the three factors determines the global lane change feasibility. If a defined threshold value for the minimum is exceeded, it is assumed that a lane change into the corresponding direction is feasible.

In the rear area, the necessary deceleration for an approaching vehicle in the event of a lane change of the given vehicle, is computed as a value relevant to the lane change. In the front area, the necessary deceleration for the given vehicle is analyzed should the latter carry out a lane change and the target lane already be occupied by another vehicle. In the lateral area, the space required for making the lane change is analyzed. The lane change feasibility is then obtained from the ratio between the necessary and the reasonable deceleration (rear and front area) or between the necessary and the available space in the lateral area.

Since, particularly when assuming that in the event of a detected collision object, the driver can possibly still overtake or evade, the last-possible evading point in time has to be taken into account when determining the intervention point in time, this last-possible evading point in time is also taken into account in an advantageous further development of the invention.

For determining the last-possible evading point in time or the necessary distance for a narrow overtaking maneuver, for example, an overtaking parabola with an assumed lateral deceleration is placed in the free area between the given vehicle and the potential collision object. The distance in the longitudinal direction necessary for the overtaking or evading maneuver is then obtained as a function of the momentary relative speed, as well as the lateral distance to be overcome. The latter may consist of the widths of the given vehicle and the other vehicle/object as well as of the current object position. Since a maximal lateral acceleration cannot be assumed at low speeds, the lateral acceleration is adapted as a function of the speed.

Taking into account the end point in time of the determined driver reaction, a last-possible braking point in time determined (in a known manner) and the determined last-possible evading point in time, the situation can be evaluated to the end of the reaction time, and thereby at least a preliminary intervention point in time can be determined for an autonomous braking intervention. For this purpose, as indicated above, the corresponding reaction time is first assigned to the three possible reaction triggers. A continuous approach to a vehicle ahead is, in this case, considered to be an expected event; a sudden braking or a cutting-in vehicle is considered to be an unexpected event. If, at the point in time of the occurrence of the reaction requirement, the corresponding reaction duration is subtracted from the time to collision (TTC), the determined value—thus, the time after the reaction that remains for preventing the collision—can be compared with the threshold values for a braking or an overtaking or evading maneuver.

In the case of low differential speeds (i.e. here, with respect to the time, the last-possible evading point in time is before the last-possible braking point in time), the last-possible braking point in time can always be used as an intervention point in time, because the driver has no other alternative for preventing the collision.

In the case of high differential speeds, at which an overtaking or evading is still possible after the last-possible braking point in time, however, three possible situations will occur.

In the first case, if with respect to the time, the determined end point in time of the driver reaction time is before the determined last-possible braking point in time, the last-possible braking point in time can therefore be selected as the preliminary intervention point in time because, in the case of an autonomous collision avoidance by the driver, a corresponding reaction already exists beforehand. For this case, the avoidance of an accident will therefore always be possible.

In the second case, it is assumed that the determined end point in time of the driver reaction time occurs before the determined last-possible evading point in time and after the determined last-possible braking point in time. Since the probability of an autonomous mastering of the situation by the driver is much higher than that of a rear collision, a braking intervention, if necessary, will be initiated only at the end of the reaction time. However, in the least favorable case, this may mean that the emergency braking will no longer be sufficient for completely preventing the collision. In order to partially solve this conflict, the standardized value for judging the lane change possibility from the reaction time estimation will be used; i.e. in this case, the preliminary intervention point in time is defined as a function of the feasibility of an evading maneuver. In this case, the last-possible braking point in time is defined as the preliminary intervention point in time if an evading maneuver is not feasible, while the determined end point in time of the driver reaction time will be defined as the preliminary intervention point if an evading maneuver can be carried out safely. If no lane change is possible, a fully collision-preventing braking will therefore take place.

In the third case, it is assumed that the determined end point in time of the driver reaction time is after the determined last-possible braking point in time and after the determined last-possible evading point in time, the determined last-possible evading point in time occurring after the determined last-possible braking point in time. In this case, the automatic braking intervention may already be carried out at the last-possible braking point in time because a timely reaction by the driver is very improbable.

For an even better definition of the intervention point in time of the emergency brake assistant, it is also important, in addition to the above-mentioned parameters, to check and take into account the actual driver reaction. In particular, the driver reaction (for example, braking or overtaking) occurring during and/or after the determined driver reaction time should be taken into account. If there is a reaction (or it is at least believed that there is a reaction) and it is sufficient for the autonomous avoidance of the collision, or the evading or take-over maneuver can be carried out, the preliminary intervention point in time determined in the differentiation of cases will be delayed to the so-called "point of no return", thus the determined last-possible evading point in time. Although the latter should never be reached because of the driver reaction that was judged to be adequate, it can nevertheless be maintained as a fall-back level. Otherwise, the determined preliminary intervention point in time is defined as the intervention point in time.

Indicators can in each case be determined for the two action options "braking" and "overtaking". A braking effect can be applied by the normal operating of the brake pedal as well as by the buildup of drag torque by releasing the gas pedal. The overtaking reaction can be detected by recognizing a decreasing overlap with respect to the vehicle ahead or by a corresponding course of the steering angle. For an early inclusion of the intention to overtake, the use of lane change motivation models is obvious. The recognition of the flasher operation for the lane change is a simplified approach for this purpose.

For checking whether the detected reaction is also present in a timely and adequate manner, in the case of the braking, the applied deceleration is compared with the deceleration required for preventing the collision. The latter is a function of the momentary relative speed between the given vehicle and the collision object, the momentary distance between the two vehicles as well as the deceleration of the other vehicle.

In the case of an existing intention or reaction for the purpose of overtaking, it has to be checked—as mentioned above—whether the lane change or the evading maneuver is feasible. The evaluation of the change-over possibility computed within the scope of the reaction time estimate can be used for this purpose.

Other objects, advantages and novel features of the present invention will become apparent from the following detailed description of one or more preferred embodiments when considered in conjunction with the accompanying drawings.

BRIEF DESCRIPTION OF THE DRAWINGS

The invention will now be explained in detail by means of an embodiment.

DETAILED DESCRIPTION OF THE DRAWINGS

Figure 1:
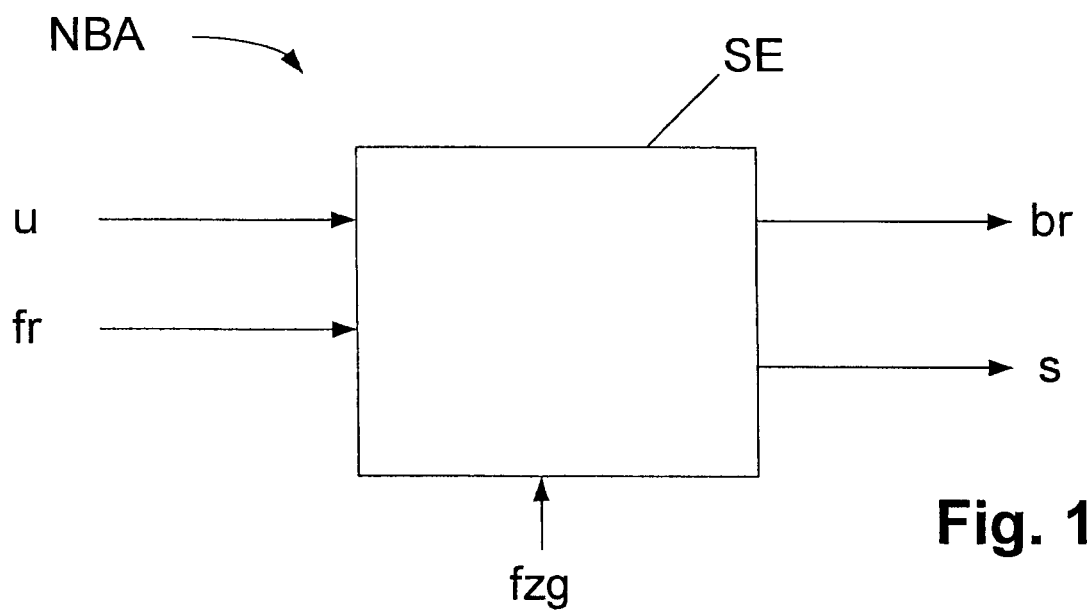
FIG. 1 is a view of an extremely simplified construction of the emergency brake assistant according to the invention.

FIG. 1 illustrates an emergency brake assistant NBA for automatically decelerating a vehicle for preventing a collision or reducing the consequences of a collision with a detected collision object by means of a control unit SE which receives various data u, fr and fzg and, as a function of these data, emits a signal br for activating a brake unit not shown here as well as, if required, emits a signal s for generating a visual, acoustic or haptic warning. The data are, for example, environmental data that may provide information on objects and on the type of road (for example, multi-lane). In order to be able to determine a collision object, a last-possible evading point in time and/or a last-possible braking intervention point in time for preventing a collision, additionally further vehicle data fzg, such as the current speed of the vehicle, the relative speed and/or the distance to a detected object are analyzed.

Finally, the driver reaction data also provide information concerning actions by the driver, particularly as to whether the driver reacts correspondingly to a detected collision object in order to prevent the collision.

As a function of these input data, an intervention point in time for a brake system of the vehicle will then be determined for decelerating the vehicle. At the determined intervention point in time, a signal br is emitted for activating the braking system. In addition, starting with the detecting of the collision object, an indication signal s for activating an acoustic, visual or haptic warning can also be triggered.

Figure 2:
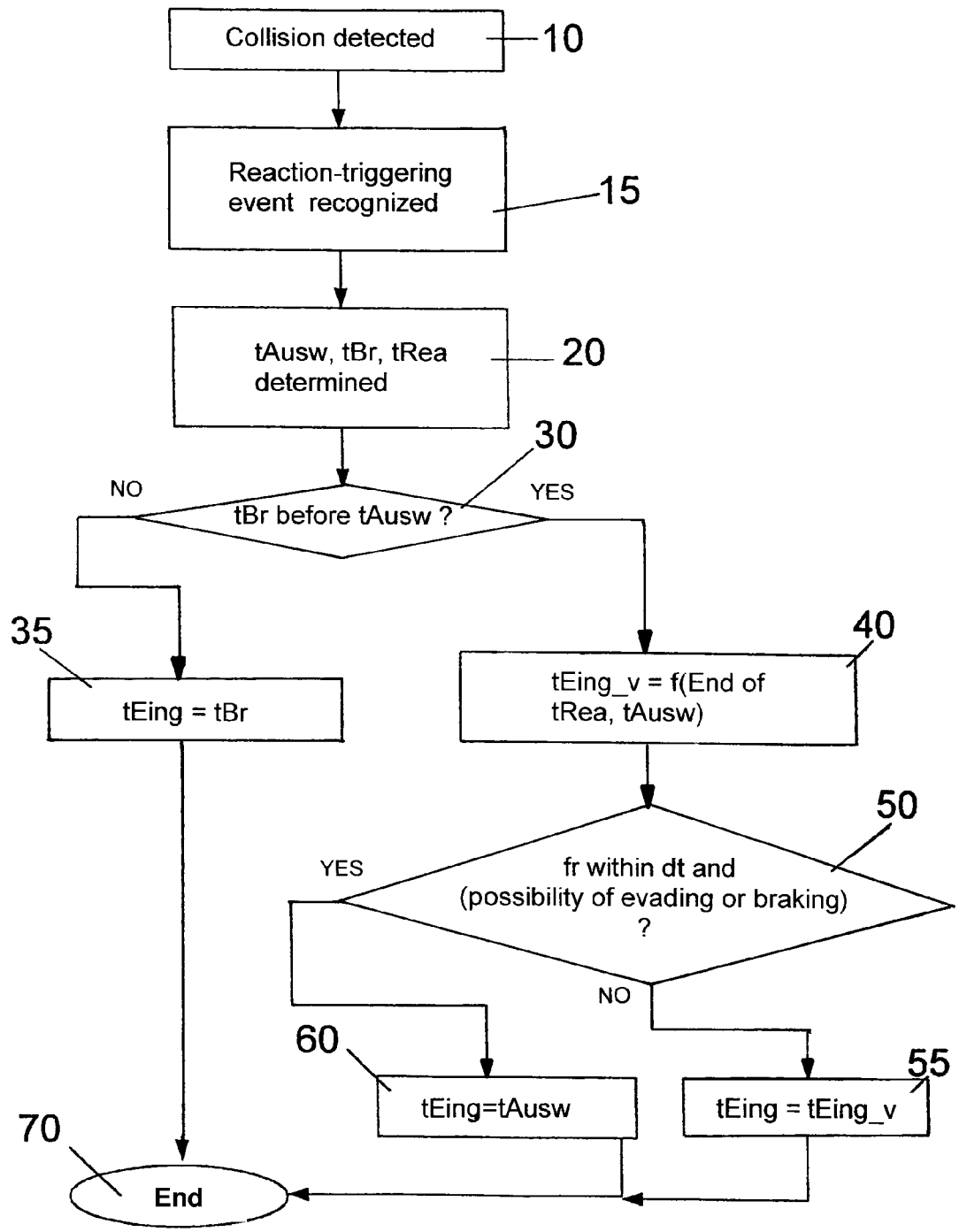
FIG. 2 is a flow chart for determining an intervention point in time within the scope of an emergency brake assistant.

By means of the flow chart illustrated in FIG. 2, the approach for determining the intervention point in time within the scope of the emergency brake assistant will now be discussed in detail.

The determination operation starts in Step 10 as soon as a collision object was detected. In the next Step 15, events are identified from the movements of the given vehicle, as well as from the detected collision object to which the driver has to react for autonomously preventing the collision. In Step 20, the last-possible points in time for a braking tBr and an evading operation or a narrow overtaking maneuver tAusw are then determined. The former can easily be determined by modeling a system braking. It indicates the point in time at which the latest a full deceleration braking has to take place in order to still prevent the collision. Several approaches exist for the determination of the last-possible point in time for an evading or overtaking maneuver. For example, as explained above, a parabola can be assumed to be the trajectory. The assumption of a circular path or an empirical determination are also conceivable.

In a parallel manner, a maximal reaction time tRea is estimated based on the momentary driving environment and as a function of the existing event (continuous approach to the collision object driving ahead or abrupt braking of the latter or cutting-in of the collision object into the given drive trajectory), which reaction time tRea is valid for a majority of drivers. The longer the reaction time tRea, the more unexpected the occurrence of the event. The continuous approach to the vehicle ahead therefore causes a shorter reaction time tRea than a sudden braking. Empirical tests indicate that the reaction time tRea can be modeled as a gamma distribution. Individual parameters exist for the different reaction causes, which parameters adapt the form of the distribution. When using this gamma distribution, the percentage that indicates the proportion of covered drivers can therefore be predefined.

When the predefinition amounts to 80%, only 20% of drivers remain whose reaction time tRea in the tests is still longer than the resulting value.

In addition, the reaction time tRea is increased by the number of conceivable action alternatives. Thus, if the driver can decide between braking and overtaking (he therefore has 2 alternatives), his reaction time tRea will logarithmically increase according to Hick's Law. From the system perspective, this means that the possibility of carrying out an overtaking or evading maneuver has to be examined. For this purpose, the distance as well as the relative speed with respect to the vehicle ahead in the adjacent lane, the clearance adjacent to the given vehicle as well as the relative speed and the distance of a vehicle approaching from the rear in the adjacent lane are analyzed in a three-step process. If all three checks do not point to any danger in the adjacent lane, there is the possibility of a lane change—the reaction time tRea is extended. The modeled reaction time tRea will start running with the occurrence of an event.

A preliminary intervention point in time tEing_v (under certain circumstances, also already the final intervention point in time tEing) is determined from the modeled reaction time tRea and the current situation during the next steps. For this purpose, it is checked beforehand in Step 30 whether, with respect to time, the last-possible braking point in time tBr is already occurring before the last-possible evading point in time. If this is not so, the last-possible braking point in time tBr will be defined in Step 35 as the final intervention point in time tEing. The process will then be terminated immediately.

However, if the last-possible braking point in time tBr already occurs before the last possible evading point in time tAusw, a preliminary intervention point in time tEing_v will be determined in the next Step 40. In this case, the driver reaction plays no role at first. Only the end of the reaction time tRea—thus the current TTC (time-to-collision) minus the (remaining) reaction time—will be analyzed. This results in three different cases:

Case 1: The reaction time tRea ends before the last-possible braking point in time tBr. Here, the intervention should take place at the last-possible braking point in time tBr.

Case 2: The reaction time tRea ends between the last possible braking point in time tBr and the last possible evading or overtaking point in time tAusw. Here, the intervention is to take place at the last-possible braking point in time tBr if a lane change is not possible, and at the end of the reaction time tRea, if a lane change is possible.

Case 3: The reaction time tRea ends after the last-possible overtaking point in time tAusw. In this case, the driver can no longer react autonomously to the impending collision. The intervention takes place at the last-possible braking point in time tBr. If the latter has already been passed, the intervention will take place immediately.

In the subsequent Step 50, the driver reaction fr to the event is evaluated within a predefined time period dt (during and after the end of the reaction time tRea). As reactions fr, a differentiation is made between an overtaking maneuver and a braking. A decreasing overlap of the given vehicle with the vehicle driving ahead or a high acceleration may indicate an overtaking maneuver. The operation of the brake pedal or a release of the accelerator pedal may indicate a braking.

However, the reaction fr alone is not sufficient for changing the preliminary intervention point in time tEing_v determined in the preceding step. For this purpose, an additional checking is necessary as to whether the evading or overtaking maneuver is actually feasible or whether the applied deceleration is actually sufficient for preventing the collision. If this is so (Step 60), it is assumed that the driver is autonomously alleviated the situation. The final intervention point in time tEing is therefore delayed to the last-possible evading point in time (tAusw delayed). Although the collision is no longer avoidable—because of the recognized adequate reaction, this point in time should not be reached at all. In the event of a false reaction recognition, the full deceleration will still reduce the consequences of the collision. If the reaction fr is not feasible/sufficient or no reaction fr can be recognized (Step 55), the preliminary intervention point in time tEing_v will become the final intervention point in time tEing. The process ends in Step 70.

By including the driver reaction in the determination of the intervention point in time for a danger braking system, the number of false activations in the case of high relative speeds can be drastically reduced. If the driver exhibits no or an inadequate reaction, the collision is avoided by the danger braking system. In contrast, if the driver reacts sufficiently to the event, an intervention does not take place before a point in time at which an overtaking or evading can also no longer take place.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An emergency brake assistant for automatically decelerating a vehicle to prevent a collision or reduce the consequences of a collision with a detected collision object, at a determined intervention point in time, wherein a brake system of the vehicle is automatically activated such that a collision with the detected collision object can be prevented or consequences of the collision can be reduced, wherein the intervention point in time is determined as a function of a determined end point in time of a driver reaction time and of a determined last-possible braking point in time and of a determined last-possible evading point in time, wherein the determined intervention point in time is determined such that, at the determined end point in time of the driver reaction time, which occurs before the determined last-possible braking point in time, the last possible braking point in time is defined as a preliminary intervention point in time, or that, at the determined end point in time of the driver reaction time, which occurs before the determined last-possible evading point in time and after the determined last-possible braking point in time, the last-possible braking point in time or the determined end point in time of the driver reaction time is defined as the preliminary intervention point in time, or that, at the determined last-possible evading point in time, which occurs after the determined last-possible braking point in time and before the determined end point in time of the driver reaction time, the last possible braking point in time is defined as the preliminary intervention point in time.

2. The emergency brake assistant according to claim 1, wherein at the determined end point in time of the driver reaction time, which occurs before the determined last-possible evading point in time and after the determined last-possible braking point in time, the last-possible braking point in time is defined as the preliminary intervention point in time if an evading maneuver is not feasible, and the determined end point in time of the driver reaction time is defined as the preliminary intervention point in time, if an evading maneuver is feasible.

3. The emergency brake assistant according to claim 1, wherein the intervention point in time can only be determined in such a manner if the last-possible evading point in time, with respect to time, is after the last-possible braking point in time.

4. The emergency brake assistant according to claim 2, wherein the intervention point in time can only be determined in such a manner if the last-possible evading point in time, with respect to time, is after the last-possible braking point in time.

5. The emergency brake assistant according to claim 1, wherein when determining the intervention point in time, the driver reaction, during at least one of the determined driver reaction time and after the end point in time of the determined driver reaction time, can be taken into account.

6. The emergency brake assistant according to claim 2, wherein when determining the intervention point in time, the driver reaction, during at least one of the determined driver reaction time and after the end point in time of the determined driver reaction time, can be taken into account.

7. The emergency brake assistant according to claim 1, wherein the intervention point in time can be determined such that the determined last-possible evading point in time is defined as the intervention point in time when an evading operation to be carried out by the driver is recognized or assumed and a feasibility of the evading maneuver is recognized.

8. The emergency brake assistant according to claim 2, wherein the intervention point in time can be determined such that the determined preliminary intervention point in time is defined as the intervention point in time when an evading operation to be carried out by the driver is not recognized or not assumed.

9. The emergency brake assistant according to claim 1, the driver reaction time can be determined as a function of the occurrence of the collision object and/or of the number of the conceivable action alternatives when a collision object is detected.

10. A method for automatically decelerating a vehicle comprising:
   determining an intervention point in time based on a determined end point in time of a driver reaction time, a determined last-possible braking point in time, and a determined last-possible evading point in time; and
   activating, automatically, a brake system of the vehicle at the determined intervention point in time such that a collision with a detected collision object is prevented or consequences of the collision reduced,
   wherein the determined intervention point in time is determined such that, at the determined end point in time of the driver reaction time, which occurs before the determined last-possible braking point in time, the last possible braking point in time is defined as a preliminary intervention point in time, or that, at the determined end point in time of the driver reaction time, which occurs before the determined last-possible evading point in time and after the determined last-possible braking point in time, the last-possible braking point in time or the determined end point in time of the driver reaction time is defined as the preliminary intervention point in time, or that, at the determined last-possible evading point in time, which occurs after the determined last-possible braking point in time and before the determined end point in time of the driver reaction time, the last possible braking point in time is defined as the preliminary intervention point in time.

11. The method according to claim 10, wherein the intervention point in time can be determined such that the determined last-possible evading point in time is defined as the intervention point in time when an evading operation to be carried out by the driver is recognized or assumed and a feasibility of the evading maneuver is recognized.

12. The method according to claim 10, the driver reaction time can be determined as a function of the occurrence of the collision object and/or of the number of the conceivable action alternatives when a collision object is detected.

13. The method according to claim 10, wherein at the determined end point in time of the driver reaction time, which occurs before the determined last-possible evading point in time and after the determined last-possible braking point in time, the last-possible braking point in time is defined as the preliminary intervention point in time if an evading maneuver is not feasible, and the determined end point in time of the driver reaction time is defined as the preliminary intervention point in time, if an evading maneuver is feasible.

14. The method according to claim 10, wherein the intervention point in time can only be determined in such a manner if the last-possible evading point in time, with respect to time, is after the last-possible braking point in time.

15. The method according to claim 10, wherein when determining the intervention point in time, the driver reaction, during at least one of the determined driver reaction time and after the end point in time of the determined driver reaction time, can be taken into account.

16. The method according to claim 10, wherein the intervention point in time can be determined such that the determined preliminary intervention point in time is defined as the intervention point in time when an evading operation to be carried out by the driver is not recognized or not assumed.

* * * * *